(12) United States Patent
Alperin et al.

(10) Patent No.: US 8,799,512 B2
(45) Date of Patent: Aug. 5, 2014

(54) CROSS-PLATFORM SUPPORT FOR A VARIETY OF MEDIA TYPES

(75) Inventors: Jordan Alperin, Denver, CO (US); Rich Cerami, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 1212 days.

(21) Appl. No.: 11/255,089

(22) Filed: Oct. 19, 2005

(65) Prior Publication Data

US 2007/0088850 A1    Apr. 19, 2007

(51) Int. Cl.
*G06F 15/16* (2006.01)

(52) U.S. Cl.
USPC ......... 709/245; 709/246; 709/227; 455/414.4

(58) Field of Classification Search
USPC ......... 709/230, 217, 236, 203, 146, 245, 246, 709/227; 455/414.4
See application file for complete search history.

(56) References Cited

U.S. PATENT DOCUMENTS

| | | | |
|---|---|---|---|
| 5,406,557 A | 4/1995 | Baudoin | |
| 5,937,162 A | 8/1999 | Funk et al. | |
| 6,345,279 B1 | 2/2002 | Li et al. | |
| 6,353,827 B1 | 3/2002 | Davies et al. | |
| 6,385,611 B1 | 5/2002 | Cardona | |
| 6,407,680 B1 | 6/2002 | Lai et al. | |
| 6,442,589 B1 | 8/2002 | Takahashi et al. | |
| 6,442,606 B1 | 8/2002 | Subbaroyan et al. | |
| 6,459,776 B1 | 10/2002 | Aktas et al. | |
| 6,556,217 B1 | 4/2003 | Makipaa et al. | |
| 6,564,264 B1 * | 5/2003 | Creswell et al. | 709/245 |
| 6,631,181 B1 | 10/2003 | Bates et al. | |
| 6,675,261 B2 * | 1/2004 | Shandony | 711/121 |
| 6,694,004 B1 | 2/2004 | Knoerle | |
| 6,754,904 B1 | 6/2004 | Cooper et al. | |
| 6,768,789 B1 | 7/2004 | Wilk | |
| 6,782,253 B1 | 8/2004 | Shteyn et al. | |
| 6,799,174 B2 | 9/2004 | Chipman et al. | |
| 6,816,582 B2 | 11/2004 | Levine | |
| 6,826,173 B1 | 11/2004 | Kung et al. | |
| 6,832,259 B2 | 12/2004 | Hymel et al. | |
| 6,832,377 B1 | 12/2004 | Havemose | |
| 6,879,838 B2 | 4/2005 | Rankin et al. | |
| 6,938,087 B1 * | 8/2005 | Abu-Samaha | 709/227 |
| 7,013,331 B2 | 3/2006 | Das | |
| 7,072,056 B1 | 7/2006 | Greaves et al. | |

(Continued)

OTHER PUBLICATIONS

U.S. Appl. No. 11/228,446, filed Sep. 15, 2005, Jordan Alperin.

(Continued)

*Primary Examiner* — Harunur Rashid
(74) *Attorney, Agent, or Firm* — Swanson & Bratschun, L.L.C.

(57) ABSTRACT

Systems, methods, and machine-readable media are disclosed to provide cross-platform support for a variety of media types. In one embodiment, a method of providing cross-platform support for a variety of media types can comprise translating content provided by one or more servers from one or more media types to one or more common language messages. Each common language message can be one of a plurality of message types. Each message type can represent a different user-facing service provided by the server. The one or more common language messages can be sent to one or more end devices of one or more different device types. The common language messages can be translated to a format specific to one or more of the end devices based on the device type.

27 Claims, 6 Drawing Sheets

(56) References Cited

U.S. PATENT DOCUMENTS

| | | | |
|---|---|---|---|
| 7,212,543 B1* | 5/2007 | Arwald et al. | 370/466 |
| 7,219,163 B2 | 5/2007 | Robinson et al. | |
| 7,272,662 B2* | 9/2007 | Chesnais et al. | 709/246 |
| 7,277,529 B1 | 10/2007 | Wuthnow et al. | |
| 7,310,625 B2 | 12/2007 | Wu | |
| 7,343,371 B2 | 3/2008 | Ibuki et al. | |
| 7,526,572 B2 | 4/2009 | Omar et al. | |
| 7,587,033 B2 | 9/2009 | Crago et al. | |
| 7,688,962 B1 | 3/2010 | Knoerie et al. | |
| 8,078,476 B2 | 12/2011 | Alperin et al. | |
| 8,095,664 B2 | 1/2012 | Yamaguchi et al. | |
| 8,320,535 B2 | 11/2012 | Alperin et al. | |
| 2002/0076027 A1 | 6/2002 | Bernnan et al. | |
| 2002/0087704 A1 | 7/2002 | Chesnais et al. | |
| 2002/0102965 A1 | 8/2002 | Mandahl et al. | |
| 2002/0111991 A1 | 8/2002 | Wood et al. | |
| 2002/0120451 A1 | 8/2002 | Kato et al. | |
| 2002/0169823 A1 | 11/2002 | Coulombe et al. | |
| 2002/0170067 A1 | 11/2002 | Norstrom et al. | |
| 2002/0194150 A1 | 12/2002 | Bates et al. | |
| 2003/0041058 A1 | 2/2003 | Ibuki et al. | |
| 2003/0088633 A1 | 5/2003 | Chiu et al. | |
| 2003/0101450 A1 | 5/2003 | Davidsson et al. | |
| 2003/0147369 A1 | 8/2003 | Singh et al. | |
| 2003/0149646 A1 | 8/2003 | Chen et al. | |
| 2003/0172139 A1 | 9/2003 | Srinivasan et al. | |
| 2003/0172175 A1 | 9/2003 | McCormack et al. | |
| 2003/0177408 A1 | 9/2003 | Fields et al. | |
| 2004/0054719 A1 | 3/2004 | Daigle et al. | |
| 2004/0075698 A1 | 4/2004 | Gao et al. | |
| 2004/0170155 A1 | 9/2004 | Omar et al. | |
| 2004/0236753 A1 | 11/2004 | Porcari | |
| 2005/0015443 A1* | 1/2005 | Levine et al. | 709/204 |
| 2005/0018653 A1 | 1/2005 | Phillips et al. | |
| 2005/0033806 A1 | 2/2005 | Harvey et al. | |
| 2005/0086282 A1* | 4/2005 | Anderson et al. | 709/200 |
| 2005/0101343 A1 | 5/2005 | Hsiao | |
| 2005/0144557 A1 | 6/2005 | Li et al. | |
| 2005/0201533 A1 | 9/2005 | Emam et al. | |
| 2005/0235307 A1 | 10/2005 | Relan et al. | |
| 2005/0254635 A1 | 11/2005 | Koretsky et al. | |
| 2005/0262542 A1 | 11/2005 | DeWeese et al. | |
| 2006/0017983 A1 | 1/2006 | Syri et al. | |
| 2006/0026302 A1 | 2/2006 | Bennett et al. | |
| 2006/0184624 A1 | 8/2006 | Thukral | |
| 2006/0206941 A1* | 9/2006 | Collins | 726/25 |
| 2006/0218575 A1 | 9/2006 | Blair | |
| 2006/0265427 A1 | 11/2006 | Cohen et al. | |
| 2006/0277316 A1* | 12/2006 | Wang et al. | 709/231 |
| 2007/0058569 A1* | 3/2007 | McMenamin et al. | 370/254 |
| 2007/0079010 A1 | 4/2007 | Heredia et al. | |
| 2007/0097394 A1 | 5/2007 | Zaima et al. | |
| 2007/0104184 A1 | 5/2007 | Ku et al. | |
| 2007/0139513 A1 | 6/2007 | Fang | |
| 2007/0239895 A1 | 10/2007 | Alperin et al. | |
| 2008/0177616 A1 | 7/2008 | Nemirofsky et al. | |

OTHER PUBLICATIONS

U.S. Appl. No. 11/266,011, filed Nov. 2, 2005, Jordan Alperin et al.
U.S. Appl. No. 11/293,028, filed Dec. 2, 2005, Jordan Alperin et al.
U.S. Appl. No. 11/292,801, filed Dec. 2, 2005, Jordan Alperin et al.
U.S. Appl. No. 11/399,096, filed Apr. 5, 2006, Jordan Alperin et al.
U.S. Appl. No. 11/399,585, filed Apr. 5, 2006, Jordan Alperin et al.
U.S. Appl. No. 11/399,097, filed Apr. 5, 2006, Jordan Alperin et al.
U.S. Appl. No. 11/399,098, filed Apr. 5, 2006, Jordan Alperin et al.
U.S. Appl. No. 11/399,584, filed Apr. 5, 2006, Jordan Alperin.
U.S. Appl. No. 11/400,643, filed Apr. 6, 2006, Jordan Alperin et al.
U.S. Appl. No. 11/400,616, filed Apr. 6, 2006, Jordan Alperin et al.
U.S. Appl. No. 11/400,644, filed Apr. 6, 2006, Jordan Alperin et al.
U.S. Appl. No. 11/383,620, filed May 16, 2006, Jordan Alperin.
U.S. Appl. No. 11/302,980, Office Action dated Jan. 26, 2010, 11 pages.
U.S. Appl. No. 11/302,980, Advisory Action dated Apr. 8, 2010, 2 pages.
U.S. Appl. No. 11/302,980, Office Action dated Sep. 14, 2010, 11 pages.
U.S. Appl. No. 11/223,065, Office Action dated Sep. 15, 2010, 10 pages.
U.S. Appl. No. 11/383,620, Final Office Action dated Mar. 28, 2011, 27 pages.
U.S. Appl. No. 11/399,585, Office Action dated Jul. 18, 2011, 20 pages.
U.S. Appl. No. 11/400,643; Notice of Panel Decision dated Jul. 11, 2011; 2 pages.
U.S. Appl. No. 11/399,097; Notice of Allowance dated Jul. 29, 2011; 20 pages.
U.S. Appl. No. 11/400,643 Non Final Office Action dated Jul. 28, 2011; 20 pages.
U.S. Appl. No. 11/400,616 Non Final Office Action dated Aug. 18, 2011; 35 pages.
U.S. Appl. No. 11/399,097; Notice of Allowance dated Aug. 23, 2011; 5 pages.
U.S. Appl. No. 11/383,620, Non Final Office Action dated Aug. 31, 2011; 21 pages.
U.S. Appl. No. 11/399,097; Supplemental Notice of Allowability dated Oct. 20, 2011; 5 pages.
U.S. Appl. No. 11/780,045; Office Communication dated Nov. 8, 2011; 2 pages.
U.S. Appl. No. 11/228,446; Examiner-Initiated Interview Summary dated Nov. 10, 2011; 2 pages.
U.S. Appl. No. 11/399,097; Issue Notification dated Nov. 22, 2011; 1 page.
U.S. Appl. No. 11/228,446; Interview Summary dated Nov. 28, 2011; 3 pages.
U.S. Appl. No. 11/228,446; Notice of Allowance dated Nov. 28, 2011; 17 pages.
U.S. Appl. No. 11/400,643 Notice of Allowance Dec. 27, 2011; 26 pages.
U.S. Appl. No. 11/399,585; Non Final Office Action dated Jan. 4, 2012; 19 pages.
U.S. Appl. No. 11/399,097; Supplemental Notice of Allowability dated Oct. 31, 2011; 5 pages.
U.S. Appl. No. 11/399,584; Decision on Appeal dated Feb. 9, 2012; 9 pages.
U.S. Appl. No. 11/383,620; Final Office Action dated Feb. 3, 2012; 18 pages.
U.S. Appl. No. 11/400,616 CT; Non Final Office Action dated Mar. 8, 2012; 26 pages.
U.S. Appl. No. 11/400,643; Notice of Allowance dated Mar. 8, 2012; 14 pages.
U.S. Appl. No. 11/388,585; Final Rejection dated May 1, 2012; 35 pages.
U.S. Appl. No. 11/228,446; Issue Notification dated May 30, 2012; 1 page.
U.S. Appl. No. 11/400,643; Issue Notification dated Jun. 13, 2012; 1 page.
U.S. Appl. No. 11/400,616; Notice of Allowance dated Jul. 3, 2012; 17 pages.
U.S. Appl. No. 11/400,616; Corrected Notice of Allowability dated Sep. 7, 2012; 11 pages.
U.S. Appl. No. 11/399,584; Non-Final Rejection dated Sep. 19, 2012; 24 pages.
U.S. Appl. No. 11/400,616; Corrected Notice of Allowability dated Oct. 26, 2012; 12 pages.
U.S. Appl. No. 11/400,616; Issue Notification dated Nov. 7, 2012; 1 page.
U.S. Appl. No. 11/399,584; Final Rejection dated Dec. 13, 2012; 23 pages.
U.S. Appl. No. 11/399,584; Non-Final Rejection dated Sep. 26, 2013; 22 pages.
U.S. Appl. No. 11/383,620; Non-Final Office Action dated Oct. 3, 2013; 24 pages.
U.S. Appl. No. 11/399,584; Final Rejection dated Jan. 16, 2014; 21 pages.
U.S. Appl. No. 11/383,620; Notice of Allowance dated Apr. 14, 2014; 16 pages.

* cited by examiner

CROSS-PLATFORM SUPPORT FOR A VARIETY OF MEDIA TYPES

BACKGROUND OF THE INVENTION

Embodiments of the present invention relate generally to communications networks and more particularly to providing support for a variety of media types across different platform types.

The term convergence is commonly used to describe the coming together or combining of two or more disparate disciplines or technologies. One well known example of convergence in telecommunications is Voice Over Internet Protocol (VOIP) which combines voice communications with data networks. Other examples of convergence have included providing the ability to access types of content or data from a device not normally associate with that type of content or data. For example, many cellular telephones today allow a user to access information other than simply making phone calls such as allowing the user to read and send emails.

Further convergence, particularly in telecommunications, has been much discussed but slow in developing. One reason true convergence between different types of platforms, devices, media types, etc has been slow in developing is that there has been no common way to interface a number of different types of devices, services, media types, etc. As with the cell phone example discussed above, convergence efforts have been limited to combinations of services provided by one service provider. Furthermore, addition or expansion of services is generally difficult and expensive, requiring extensive modifications to underlying hardware and software to provide the additional services. There has not been a common way to transparently combine services offered by different service providers and make these different services, offering different media types, available to a wide range of end devices and/or platforms.

Hence, there is a need for methods and systems that allow for more transparent combinations or convergence of different devices, services, media types, etc.

BRIEF SUMMARY OF THE INVENTION

Systems, methods, and machine-readable media are disclosed to provide cross-platform support for a variety of media types. In one embodiment, a method of providing cross-platform support for a variety of media types can comprise translating content provided by one or more servers from one or more media types to one or more common language messages. Each common language message can be one of a plurality of message types. Each message type can represent a different user-facing service provided by the server. The one or more common language messages can be sent to one or more end devices of one or more different device types. The common language messages can be translated to a format specific to one or more of the end devices based on the device type.

The method can further include generating one or more common language messages based on user input to one of the end devices and sending the one or more common language messages based on user input to one or more of the servers. The common language messages based on user input can be translated to content of one or more of the media types.

According to another embodiment, a code correlating the common language messages to one or more applications can be generated. The correlation code can be added to the common language messages. The common language messages, with the correlation codes, can then be recorded.

According to yet another embodiment, a system for providing cross-platform support for a variety of media types can comprise one or more servers. Each server can provide content of one or more media types. One or more managers can be communicatively coupled with one or more of the servers. The managers can be adapted to translate content of the servers with which the manager is connected from the media types of the servers to one or more common language messages. A communications bus can be communicatively coupled with each of the managers. The communications bus can be adapted to receive and transport the one or more common language messages from the managers. The system can also include one or more end devices of one or more different types. Each end device can be communicatively coupled with the bus and can be adapted to receive and translate the common language messages to a format specific to the end device based on the type.

The end devices can be further adapted to generate one or more common language messages based on user input and send the one or more common language messages to one or more of the managers via the bus. In such a case, the managers can be further adapted to receive the common language messages from the end devices via the bus and to translate the common language messages to content of the media types of the servers with which the manager is connected.

According to one embodiment, the system can further comprise an application framework interposed between the end devices and the communications bus and between the managers and the communications bus. The application framework can comprise a bus access layer communicatively coupled with the bus. The bus access layer can be adapted to send and receive common language messages via the bus. The application framework can also include a correlation code generator communicatively coupled with the bus access layer and one or more applications operating on one or more of the end devices. The correlation code generator can be adapted to generate a code correlating common language messages to or from the application. The system can also include an application bus access module communicatively coupled with the bus access layer and the applications operating on one or more of the end devices. The application bus access module can be adapted to add the correlation code to the common language messages from the applications. The system can also include a logger communicatively coupled with the bus access layer and the applications operating on one or more of the end devices. The logger can be adapted to record messages sent to and from the application via the bus.

According to yet another embodiment, the system can further comprise a user profile database communicatively coupled with the bus. The user profile database can be adapted to maintain records of a set of user preferences for one or more of the end devices of the interface level. Furthermore, the user profile database can be adapted to provide the preferences to one or more of the end devices or one or more of the managers in response to a common language message received via the bus.

According to still another embodiment, the system can further comprise a system audit tool communicatively coupled with the bus. The system audit tool can be adapted to monitor common language messages on the bus. The system audit tool can comprise an audit tool database for maintaining one or more logs of bus messages and a bus message logger communicatively coupled with the bus and the audit tool database and adapted to record messages from the bus in the audit tool database. In some cases, the audit tool can further comprise a heartbeat logger communicatively coupled with the bus and the audit tool database. The heartbeat logger can be adapted to record heartbeat messages sent on the bus from the one or more end devices and the one or more managers. According to one embodiment, the audit tool can further comprise an alarm sender module adapted to monitor the audit tool database and send an alarm upon the detection of a trouble condition. Also, in some cases, the audit tool can include one or more viewers communicatively coupled with the audit tool database. The viewers can be adapted to provide user access to the information of the audit tool database.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for providing cross-platform support of various media types. Embodiments of the present invention provide a common interface layer that in turn provides a generic transport for communications of various media types and connection of various services with a variety of end devices and/or platforms.

Figure 1:
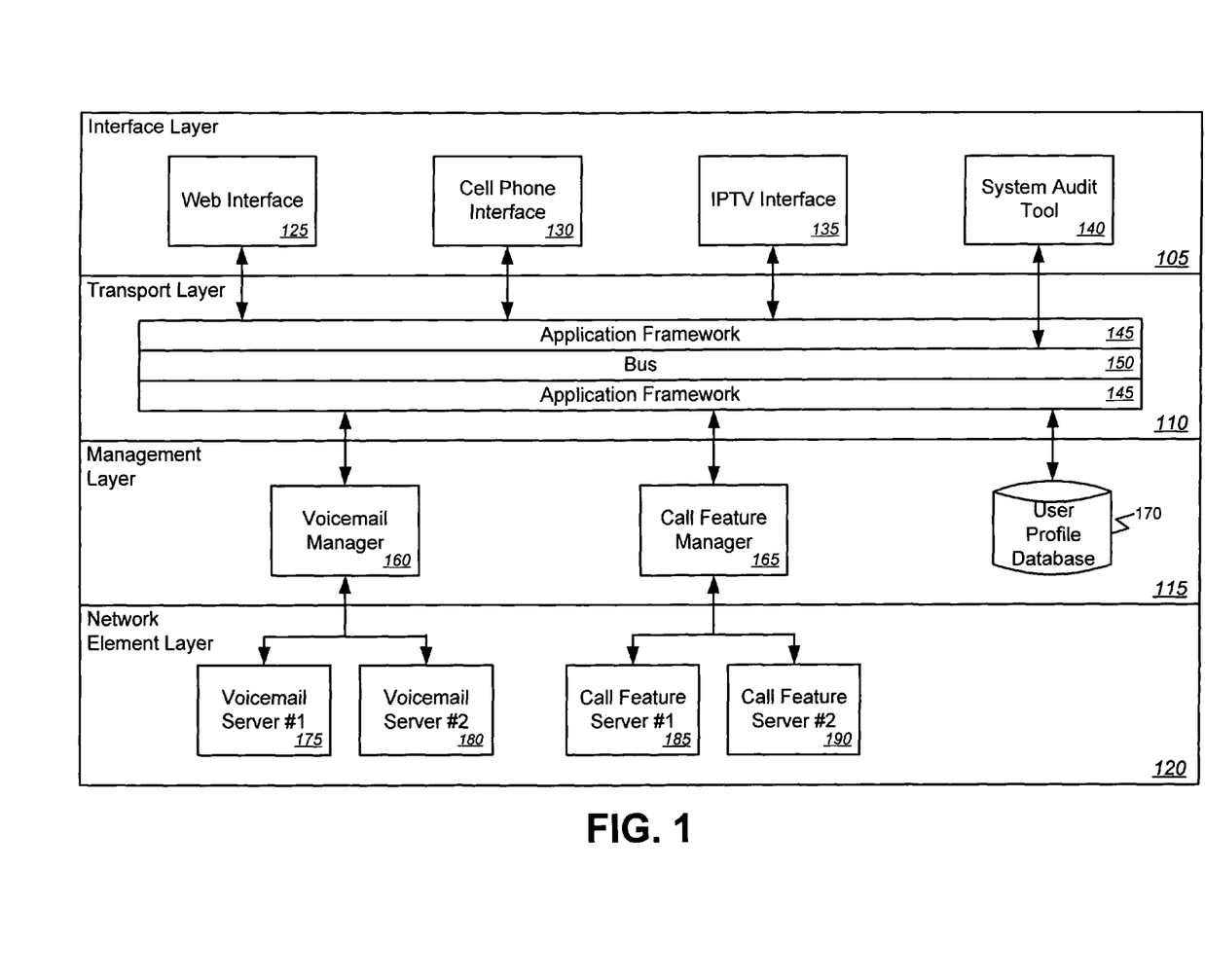
FIG. 1 is a block diagram illustrating, at a high-level, functional components of an architecture for providing cross-platform support for a variety of media types according to one embodiment of the present invention.

FIG. 1 is a block diagram illustrating, at a high-level, functional components of an architecture for providing cross-platform support for a variety of media types according to one embodiment of the present invention. In this example, the architecture is logically divided into four layers 105-120. The layers 105-120 include a network element layer 120, a management layer 115, a transport layer 110, and an interface layer 105. As will be seen, elements of each layer 105-120 can be communicatively coupled with elements of the next layer 105-120. So, elements of the network element layer 120 can be communicatively coupled with elements of the management layer 115 which in turn can be communicatively coupled with elements of the transport layer 110, which can be further communicatively coupled with elements of the interface layer 105.

The network element layer 120 can comprise one or more servers 175-190. The servers 175-190 of the network element layer 120 can each provide content and/or services of one or more types. For example, one or more servers 175 and 180 may provide voicemail services while one or more other servers 185 and 190 provide one or more call features such as call forwarding, caller ID, etc. Importantly, while this example shows a limited number of servers 175-190 in the network element layer 120, many more servers, providing a wide range of content or services of various types may be included. For example, one or more servers may be included for providing Internet services, Internet Protocol Television (IPTV) services, Email services, and various other types of data, communication, and/or entertainment services.

The management layer 115 can comprise one or more managers 160 and 165. Each manager 160 and 165 can be communicatively coupled with one or more of the servers 175-190 of the network element layer 120. For example, voicemail manager 160 can be coupled with voicemail servers 175 and 180 while call feature manager 165 can be coupled with call feature servers 185 and 190. Importantly, while managers 160 and 165 and servers 175-190 are shown and described herein as being organized by arranged per service, other arrangements are contemplated and considered to be within the scope of the present invention. According to one alternative, the managers 160 and 165 and the servers 175-190 may be arranged by company or provider. So, for example, one manager may be coupled with and provide access to the services and content provided by the servers of company A while another manager may be coupled with and provide access to the services and content provided by the servers of company B. However, an arrangement of managers 160 and 165 and servers 175-190 based on service and/or content type may be preferable since, as will be seen, such an arrangement can provide for easier extensibility of the system when adding features or services.

Furthermore, as noted above, additional servers may be used in the network element layer providing additional services and/or content of different types. Therefore, more, fewer, or different managers than shown in this example may be used in an actual implementation. For example an additional manager may be used for interfacing with one or more servers providing IPTV services or email services. In another example, one or more managers may be communicatively coupled with one or more servers tracking billable events on the architecture. That is, one manager may track calls, messages, events, or pay-per-view or other content billed on a per-use basis so that the appropriate users can be billed by the operator of the architecture, the provider of the content, and/or other parties.

Regardless of the exact number, nature, or organization of the servers 175-190 and managers 160 and 165, the managers 160 and 165 can be adapted to translate content of the servers 175-190 with which the manager 160 and 165 is connected from the media types of the servers 175-190 to one or more common language messages. That is, the managers 160 and 165 can provide translation from a service specific format to a common or generic format. For example, voicemail server #1 175 and voicemail server #2 180 may be operated by different entities and offer different information in different formats that may be completely incompatible with each other. However, voicemail manager 160 provides for translating these different functions, formats, etc into a common language message that can be used by all other elements of the architecture.

According to one embodiment of the present invention, the managers 160 and 165 can provide defined interfaces to the servers 175-190 of the network element layer 120. By using calls, invocations, requests, or other signals or messages to the managers 160 and 165, the servers 175-190 can pass content or messages to the managers 160 and 165 for translation to a common language message for transmission to another element of the architecture. For example, voicemail manager 160 may provide an Application Program Interface (API) for use by any voicemail server 175 and 180 connected with the voicemail manager 160. Voicemail servers 175 and 180 can then use API calls to the voicemail manager 160 to initiate services, pass content or other information, and/or otherwise communicate with the voicemail server 160. According to one embodiment of the present invention, calls to the API or other interface may be closely analogous to the common language messages generated by the manager. For example, as will be described in detail below, the manager may generate "Make-a-Call" message to initiate a communication. The manager's API may also provide a "Make-a-Call" or other similar method or call to the servers to which it is connected through which the servers can initiate a communication.

While use of an API or other defined interface between the managers 160 and 165 and the servers 175-190 is not required, it may be preferred since, by using an API or other type of defined interface, the managers 160 and 165 can be easily extended or modified as services and/or content of the servers are added or changed or as new servers are added. That is, the use of a defined interface such as an API allows greater extensibility since the only changes made at the manager would be to add or modify an appropriate "stub," module, or routine to add a new server, service, or content type without a need to make wholesale changes or re-write the managers.

According to one embodiment of the present invention, the manager and the API or interface of the manager may be implemented using object-oriented programming techniques. In such a case, the manager API calls made by the servers can cause the stub or module of the manager interfacing with the server to instantiate an object of a particular class type, such as a "Make-a-Call" object, with properties representing, among other possibilities, the content of data to be communicated, the intended recipient(s), etc. Such an object or common language message may be defined in a common format or provide public properties readable by other elements of the architecture. For example, the object may comprise an Extensible Markup Language (XML) file. The manager can then transmit this object or common language message to any or all of the other elements of the architecture via the transport layer 110.

The transport layer 110 can comprise a communications bus 150 communicatively coupled with each of the managers 160 and 165. The bus 150 can be adapted to receive and transport the one or more common language messages from the managers 160 and 165. The transport layer 110 can also comprise an optional application framework 145 interposed between the end devices 125-136 of the interface layer 105 and the communications bus 150 and between the managers 160 and 165 and the communications bus 150. Details of the application framework will be discussed below with reference to FIG. 2. Generally speaking, the application framework 145 can provide for monitoring and tracking of the common language messages placed on the bus 150 of the transport layer 110.

Regardless of whether the application framework 145 is used, the bus 150 of the transport layer 110 comprises a common representation of data that is usable by all elements of the architecture. Furthermore, the bus 150 provides or communicates this message to any or all devices in the architecture as appropriate regardless of the type of device.

According to one embodiment of the present invention, the bus 150 may also be implemented using object-oriented programming techniques. In such a case, a manager placing or sending a common language message on the bus 150 can call or invoke an API or other interface of the bus 150 or otherwise cause the instantiation of an object of a particular class type, such as a "Make-a-Call" object, with properties representing, among other possibilities, the content of data to be communicated, the intended recipient(s), etc. The bus 150 can then make this object or common language message available to any or all of the other elements of the architecture.

The interface layer 105 of the architecture can comprise one or more end devices 125-136 of different types with different user interfaces. For example, the end devices 125-136 can represent a cell phone 130, a personal computer or other device with a web browser 125 interface, an IPTV interface 135, etc all potentially operating on different platforms with different operating systems. Each end device 125-136 can be communicatively coupled with the bus 150 of the transport layer 110, either directly or via the application framework 145, and can be adapted to receive and translate the common language messages to a format specific to the end device based on its type.

Alternatively or additionally, one or more of the end devices may comprise a client controller 136 communicatively coupled with the bus 150 of the transport layer 110 and one or more other end devices (not shown here) such as a personal computer, television Set Top Box (STB), telephone, or other type of device. If used, the client controller 136 can be adapted to receive common language messages from the bus 150, translate content from the common language messages to a format specific to the end device(s) for which it is intended, and deliver the device specific message to the device or devices. In some cases, the client controller 136 may also be adapted to act as a firewall for end devices communicating via the bus 150 of the transport layer 110.

That is, the end devices 125-136 can translate from the common language messages, such as an XML message, to device specific representations of the information in that message for presentation to users in whatever format that device uses. According to one embodiment, the translation functions of the end devices 125-136 can also be implemented using object-oriented programming techniques. In such a case, the end devices receive the common language messages such as XML encoded representations of the objects on the bus 150 of the transport layer 110. Translation can therefore comprise instantiating on the end device an object of the class indicated by the message with the properties indicated by the message thereby translating the properties of the object on the bus to a presentation language of the device.

Thus far, the description of the architecture has focused on messages from the servers 175-190 to the end devices 125-136. However, the end devices 125-136 can also be adapted to generate one or more common language messages based on user input and send the one or more common language messages to one or more of the managers 160-165 via the bus 150. For example, a cell phone 130 or other end device 125-136 can generate a "Make-a-call" message to be sent to any or all of the managers 160-165 or even to another end device. Therefore, the managers 160-165 can be further adapted to receive the common language messages from the end devices 125-136 via the bus 150 and to translate the common language messages to content of the media type of the servers 175-190 with which the manager 160 and 165 is connected.

According to one embodiment of the present invention, the architecture can include a user profile database 170 communicatively coupled with the bus 150 of the transport layer 110.

The user profile database 170 can be adapted to maintain records of a set of user preferences for one or more of the end devices 125-136 of the interface layer 105. For example, IPTV or cell phone settings or options for a particular device and/or a particular user can be stored in the user profile database 170 for retrieval by one or more of the end devices 125-136 or one or more of the managers 160 and 165. Therefore, the user profile database 170 can be adapted to provide the preferences to one or more of the end devices 125-136 or one or more of the managers 160 and 165 in response to a common language message received via the bus 150.

According to another embodiment of the present invention, the architecture can further comprise a system audit tool 140 communicatively coupled with the bus 150 of the transport layer 110. The system audit tool 140 can be adapted to monitor common language messages on the bus 150. Additional details of the system audit tool 140 will be discussed below with reference to FIG. 3.

Therefore, in use, the bus 150 provides a common representation of services or information available to, from, and between the end devices 125-136 and managers 160 and 165 regardless of the type of end device or the server providing or receiving the information or service. This common representation is in the form of a number of common language messages. The type, number, format, etc. of the common language messages can vary widely depending upon the exact implementation without departing from the scope of the present invention. However, for illustrative purposes only, some exemplary messages will be described.

According to one embodiment, the common language messages can include a "Make-a-Call" request message indicating a request to initiate a communication.

Similarly, the common language messages can include a "Make-a-Call" response message acknowledging initiation of a communication. According to another embodiment, the common language messages can include a "Call Information" request indicating a request for information relating to a communication and a "Call Information" response providing requested information. The common language messages can also include a "Call Event Notification" message indicating the occurrence of a communication.

In some cases, the common language messages can include an "Update Profile" message indicating a change to one or more user defined preferences. As indicated above, such a message can be useful in updating one or more entries in the user profile database 170. Furthermore, such a message may be useful in informing other devices of a change.

According to one embodiment of the present invention, the common language messages can also include a periodic "Heartbeat" message indicating a normal status of an end device, manager, and/or server. Since the architecture is loosely coupled, i.e., any given device or service is not directly coupled with any other, elements of the architecture may not be aware of the availability of another. So, each element of device can periodically send a heartbeat message. As will be discussed below, this message may be monitored by the system audit tool for maintenance and/or troubleshooting purposes.

The various types of message can take any of a variety of possible formats without departing from the scope of the present invention. However, for illustrative purposes only, an exemplary format for a message may be considered to include a header and a body. The header may include information such as any or all of: an address or other indication of the device or devices for which the message is intended; an address or other indication of the device originating the message; an indication of the message type; an indications of the type of contents in the message; etc. The message body may include information such as representation of or actual content to be transferred. Therefore, the body can contain an email message, an MP3 or MP4 audio or video file, a hyperlink or other direction to a location of the actual content, etc. However, once again, the exact format of the common language messages can vary widely depending on the exact implementation.

Regardless of the exact format, translating content to a common language message or generating a common language message can comprise generating a file, such as an XML file, of the appropriate format to indicate the type of message and the end devices for which it is intended and possibly an indication of the contents. Alternatively, as indicated above, various components of the architecture may be implemented using object-oriented programming techniques. In such a case, generating a common language message can comprise instantiating an object of a particular class type, such as a "Make-a-Call" object, with properties representing, among other possibilities, the content of data to be communicated, the intended recipient(s), etc.

Figure 2:
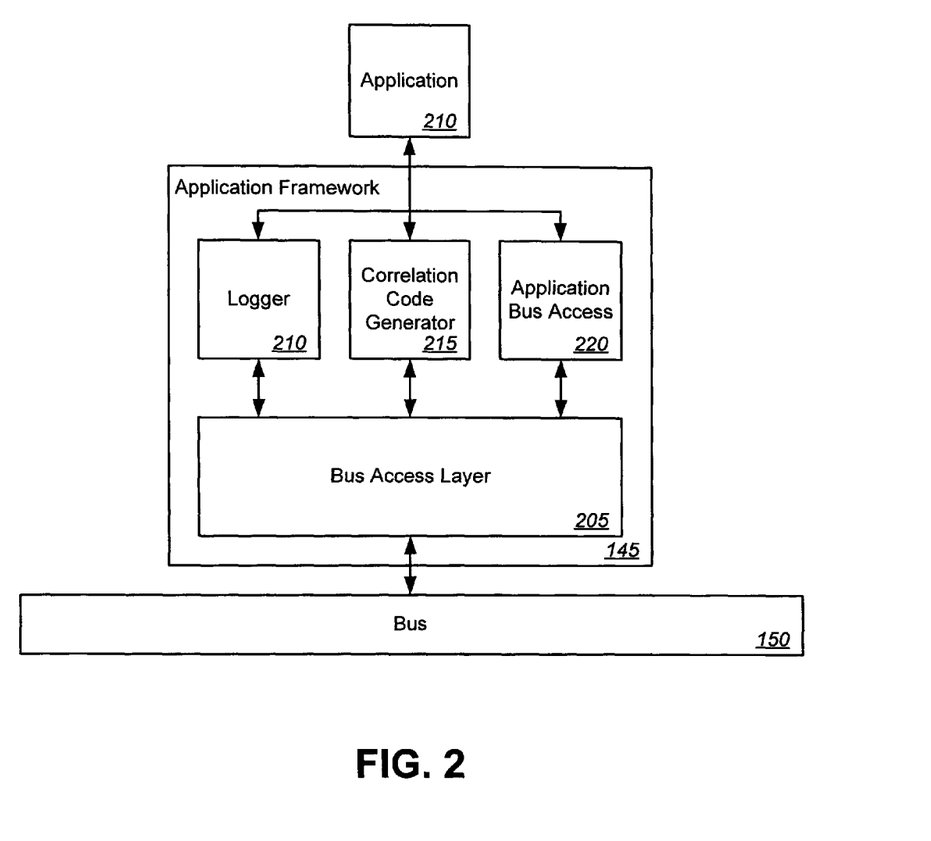
FIG. 2 is a block diagram illustrating functional components of an application framework according to one embodiment of the present invention.

FIG. 2 is a block diagram illustrating functional components of an application framework according to one embodiment of the present invention. In this example, the application framework 145 is shown communicatively coupled with the bus 150 of the transport layer 110 and an application 210 that can be operating on one or more end devices 125-136 and/or on one or more managers 160 and 165 of the management layer 115. Generally speaking, application framework 145 can be used to keep track the various elements of the architecture and messages on the bus 150. As will be seen, the application framework 145 provides for correlation between messages and application log entries with a correlation ID added to messages placed on the bus by the application and maintains records of such messages.

More specifically, the application framework, according to one embodiment of the present invention, includes a bus access layer 205 communicatively coupled with the bus 150 of the transport layer 110. The bus access layer can be adapted to send and receive common language messages via the bus 150.

The application framework can also include a correlation code generator 215 communicatively coupled with the bus access layer 205 and one or more applications 210 operating on one or more of the end devices 125-136 and/or one or more of the managers 160 and 165 of the management layer. The correlation code generator 215 can be adapted to generate a code correlating common language messages to or from the application 210. That is, the correlation code generator 215 can generate a code identifying the application that is sending or, in some cases, receiving a common language message to or from the bus 150. As will be seen, such codes can be useful in tracking and troubleshooting messages, applications and/or hardware of the architecture.

The application framework 145 can also include an application bus access module 220. The application bus access module 220 can be communicatively coupled with the bus access layer 220 and the applications 210 operating on one or more of the end devices 125-136 and/or one or more of the managers 160 and 165 of the management layer 115. The application bus access module 220 can be adapted to add the correlation code generated by the correlation code generator 215 to the common language messages from the applications 210. Alternatively, the correlation code generator 215 may add the correlation directly to the messages.

The application framework 145 can also include a logger 210. The logger can be communicatively coupled with the bus access layer 205 and the applications 210 operating on one or more of the end devices 125-136 and/or the managers 160 and 165. The logger 210 can be adapted to record messages sent to and from the application 210 via the bus 150. According to one embodiment of the present invention, the logger 210 records information regarding messages passing through the application framework 145 or the actual messages to a database for possible later troubleshooting. When a problem does occur, troubleshooting is simplified since the messages recorded in the database by the logger 210, are correlated to the applications sending and/or receiving the message by the correlation code generated by the correlation code generator 215 and added to the message by the application bus access module 220.

As noted above, use of the application framework 145 is optional as the bus 150 and the rest of the architecture can operate without the application framework 145 in place. However, use of the application framework 145 may be preferable to obtain the logging and troubleshooting abilities it provides. According to one embodiment of the present invention, a central system such as the system audit tool described in FIG. 3 can be modified to perform the same functions of the application framework 145. However, use of a separate application framework 145 may be preferable as it allows distribution of some of the processing overhead away from such a central system.

Figure 3:
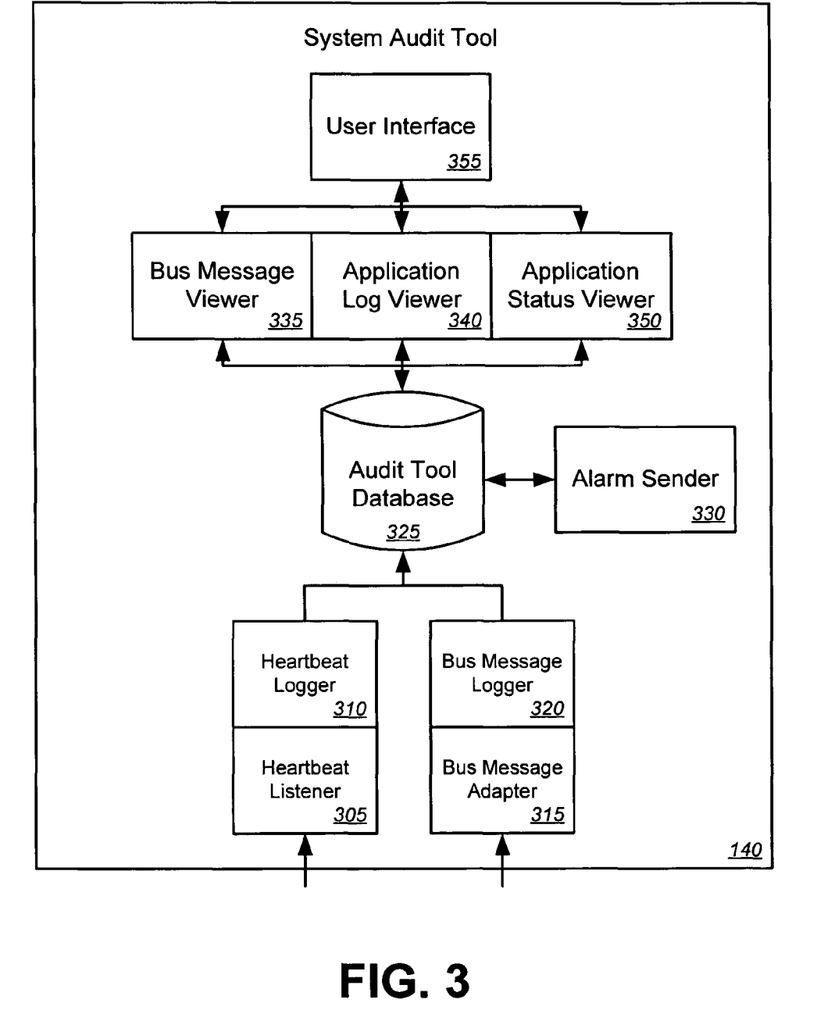
FIG. 3 is a block diagram illustrating functional components of a system audit tool according to one embodiment of the present invention.

FIG. 3 is a block diagram illustrating functional components of a system audit tool according to one embodiment of the present invention. In this example, the system audit tool 140 includes a bus message logger 320 communicatively coupled with the bus and the audit tool database 325. The audit tool database can be adapted to maintain one or more logs of bus messages. The bus message logger 320 can be adapted to record messages from the bus in the audit tool database 325. The system audit tool 140 may also include an optional bus message adapter 315 for communicatively coupling the bus message logger 320 with the bus. That is, bus message adapter 315 may include buffers and other components typically associated with a communication interface.

The system audit tool 140 can also include a heartbeat listener 305 communicatively coupled with the bus and adapted to detect periodic heartbeat messages sent by elements of the architecture. A heartbeat logger 310 may be coupled with the heartbeat listener 305 to log or record the detected heartbeat messages in the audit tool database 325. Alternatively, the functions of the heartbeat listener 305 and the heartbeat logger 310 may be performed by a single unit or module. In another alternative, rather than recording the heartbeat messages in the audit tool database 325, the heartbeat logger may record a message or indication only when an expected heartbeat message is missed or not detected.

The system audit tool 140 can further comprise an alarm sender module 330. The alarm sender module 330 can be adapted to monitor the audit tool database 330 and send an alarm upon the detection of a trouble condition. For example, upon detection of a missed heartbeat message from a particular device, the alarm sender module 330 may send an alarm to an alarm server (not shown here) or other system for handling the alarm. Such a system may take any of a number of possible actions in response to the alarm message. For example, the alarm server or other system may give a notice in the form of a page or text message to a technician, print or display a descriptive message of the condition, etc.

The system audit tool 140 can further comprise one or more viewers 335-350 communicatively coupled with the audit tool database 325. The viewers 335-350, directly or together with user interface 355, can be adapted to provide user access to the information of the audit tool database 325. As shown in this example, the viewers can include a bus message viewer 325 for reading and/or monitoring common language messages on the bus of the transport layer of the architecture, an application log viewer 340 for reading and/or monitoring logs written by various applications operating on the end devices, managers, or servers of the architecture, and an application status viewer 350 for reading and/or monitoring the current status (i.e., running, idle, etc.) of those applications.

Generally speaking, in operation, the system audit tool 140, via the bus message logger 320, listens to and archives messages from the bus of the transport layer of the architecture. According to one embodiment of the present invention, the system audit tool 140 can also collect application logs for each application. In such a case, the applications can write a flat file of events to be collected periodically or continually by the system audit tool 140 and stored in the audit tool database 325. Alternatively, the applications can proactively write the log data to the audit tool database 325. According to one embodiment, such information can be maintained in the audit tool database 325 and on devices, managers, or servers as well. In this way, the information in the audit tool database can be rebuilt if lost.

Therefore, the system audit tool 140 can bring status information for the whole architecture to single point. This makes management of a large system more practical. For example, the system audit tool 140 allows a user, through user interface 355 and/or viewers 335-350 to check the current status of different applications and track messages on the bus. So, if a particular user attempts, for example, to check his call logs or voicemail but the server handling those services is not running, the manager can easily correlate the user's request message and the missed heartbeats from server by the correlation codes added by the application framework to identify the problem.

Figure 4:
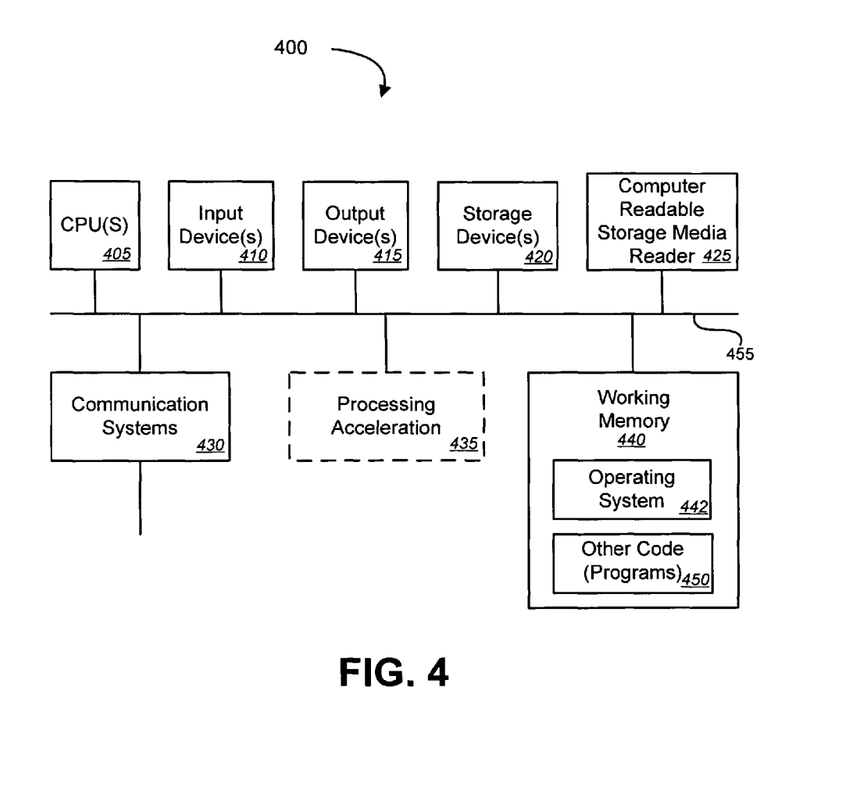
FIG. 4 is a block diagram illustrating an exemplary computer system in which embodiments of the present invention may be implemented.

FIG. 4 is a block diagram illustrating an exemplary computer system in which embodiments of the present invention may be implemented. This example illustrates a computer system 400 such as may be used, in whole, in part, or with various modifications, to provide a server, manager, end device, system audit tool or other system providing function such as those discussed above.

The computer system 400 is shown comprising hardware elements that may be electrically coupled via a bus 455. The hardware elements may include one or more central processing units (CPUs) 405, one or more input devices 410 (e.g., a mouse, a keyboard, etc.), and one or more output devices 415 (e.g., a display device, a printer, etc.). The computer system 400 may also include one or more storage device 420. By way of example, storage device(s) 420 may be disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 425, a communications system 430 (e.g., a modem, a network card (wireless or wired), an infra-red communication device, etc.), and working memory 440, which may include RAM and ROM devices as described above. In some embodiments, the computer system 400 may also include a processing acceleration unit 435, which can include a DSP, a special-purpose processor and/or the like.

The computer-readable storage media reader 425 can further be connected to a computer-readable storage medium, together (and, optionally, in combination with storage device(s) 420) comprehensively representing remote, local, fixed, and/or removable storage devices plus storage media for temporarily and/or more permanently containing computer-readable information. The communications system 430 may permit data to be exchanged with the network 420 and/or any other computer described above with respect to the system 400.

The computer system 400 may also comprise software elements, shown as being currently located within a working memory 440, including an operating system 445 and/or other code 450. It should be appreciated that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed.

Software of computer system 400 may include code 450 for implementing any or all of the function of the various elements of the architecture as described herein. For example, software, stored on and/or executed by a computer system such as system 400, can provide the functions of the system audit tool, a manager, an end device, etc. Methods implemented by software on some of these components will be discussed in detail below.

Generally speaking, a method of providing cross-platform support for a variety of media types can comprise translating content provided by one or more servers from one or more media types to one or more common language messages. Each common language message can be one of a plurality of message types. Each message type can represent a different user-facing service provided by the server. The one or more common language messages can be sent to one or more end devices of one or more different device types. The common language messages can be translated to a format specific to one or more of the end devices based on the device type.

Figure 5:
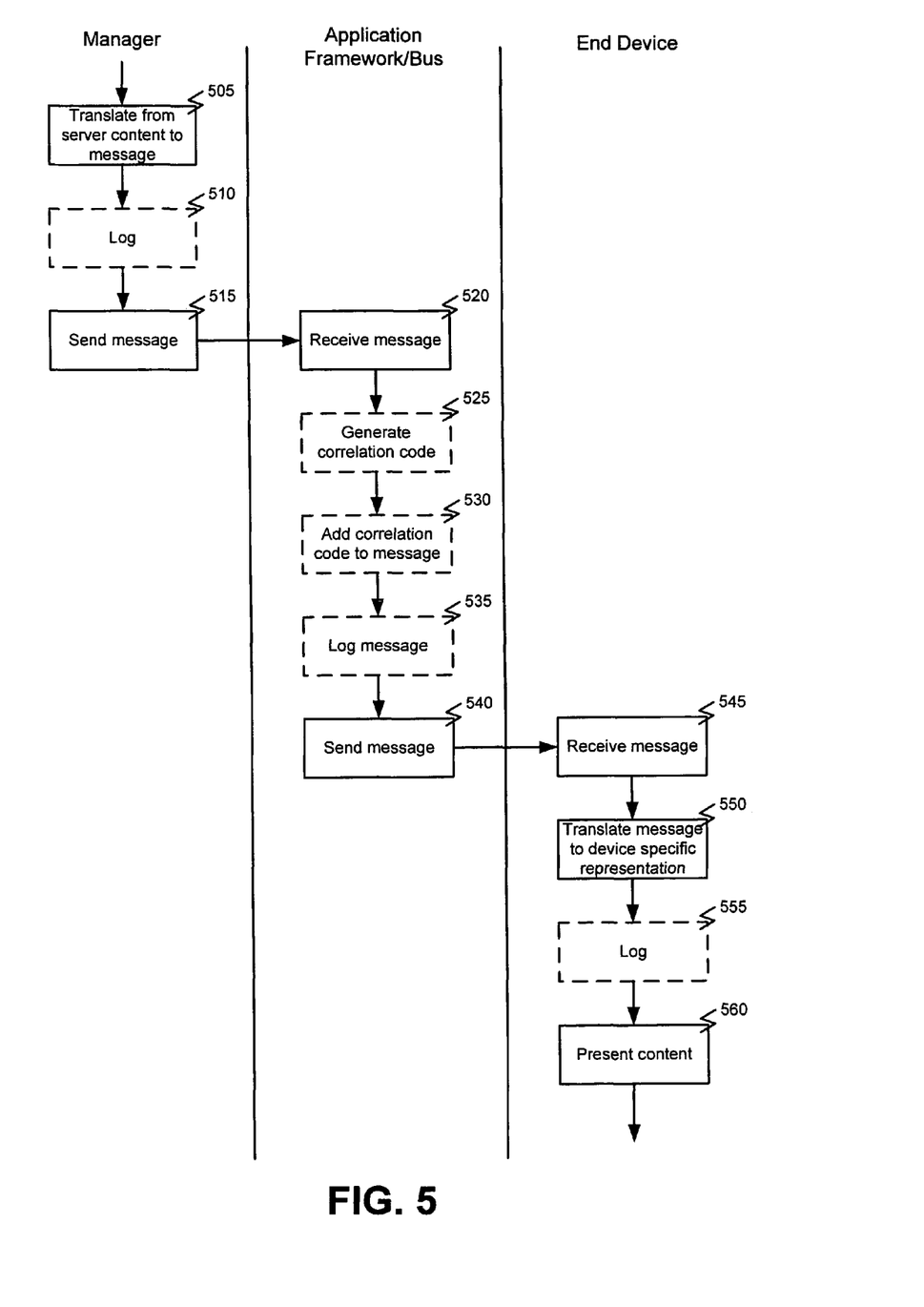
FIG. 5 is a flowchart illustrating a process for providing cross-platform support for a variety of media types according to one embodiment of the present invention.

FIG. 5 is a flowchart illustrating a process for providing cross-platform support for a variety of media types according to one embodiment of the present invention. In this example, the manager initiates a communication by translating 505 content from one or more of the servers with which it is connected to one or more common language messages for transmission on the bus to other elements of the architecture. This communication can be initiated in any of a variety of ways such as in response to the occurrence of some event, in response to a message from one of the end devices, on a regular schedule, etc.

As discussed above, the manager can optionally log 510 the message and/or other information related to the message such as the application(s) that generated the message, the content of the message, etc. The information recorded can be maintained by the manager and/or periodically transferred to the system audit tool, if any.

Once generated, the common language message can be sent 515 from the manager to be received 520 by the application framework and/or bus of the transport layer. As discussed above, according to one embodiment of the present invention, the manager may be implemented using object-oriented programming techniques. In such a case, the manager can send a common language message by instantiating an object of a particular class type, such as a "Make-a-Call" object, with properties representing, among other possibilities, the content of data to be communicated, the intended recipient(s), etc.

Also as noted above, the application framework is optional. If employed, the application framework can generating 525 a code correlating the common language messages to one or more applications sending and/or receiving the messages.

The application framework can then add 530 the correlation code to the message. As noted above, the common language messages can be recorded or logged 535 by the optional system audit tool, the application framework, or other system or device.

The message can be sent 540, either before or after being logged, to be received 545 by one or more end devices or other component of the architecture such as another manager. As discussed above, according to one embodiment of the present invention, the bus, application framework, and or software of the end device may be implemented using object-oriented programming techniques. In such a case, the bus or application manager can send a common language message to an end device by instantiating on the end device an object of a particular class type, such as a "Make-a-Call" object, with properties representing, among other possibilities, the content of data to be communicated, etc.

The end device can then translate 550 the common language message to a format specific to the end device based on the type of end device, the platform or system it is operating on, etc. The message can be optionally logged 555 on the end device or other receiving system or device. That is, the device can log 555 the message and/or other information related to the message such as the application(s) that generated and/or received the message, the content of the message, etc. The information recorded can be maintained by the device and/or transferred to the system audit tool, if any.

Finally, the device can present 560 the content of the message in a format specific to the device. For example, the device may be a web browser, in which case the contents of the message may be in HyperText Markup Language (HTML). Alternatively, the device may be an email enabled cell phone in which case the content may be presented in the form of an text email message. In yet another example, the content may indicate a request to initiate a communication. In such a case, the device may make some indication, such as an alarm or message indicating the request.

The above example has described a situation in which a communication is sent from a server of the network element layer of the architecture to an end device of the interface layer, it should be understood that such a communication can be made from one server to another, from an end device to a server or from an end device to another end device. Also, it should be understood that transmission of such message can be point-to-point type transmissions, broadcasts, or multicasts.

Generally speaking, a transmission from an end device to a server is similar to a transmission from a server to another element as described above. Such a transmission can comprise generating one or more common language messages based on user input to one of the end devices. The one or more common language messages based on user input can then be sent to one or more of the servers. The servers can then translate the common language messages based on user input to content of one or more of the media types.

Figure 6:
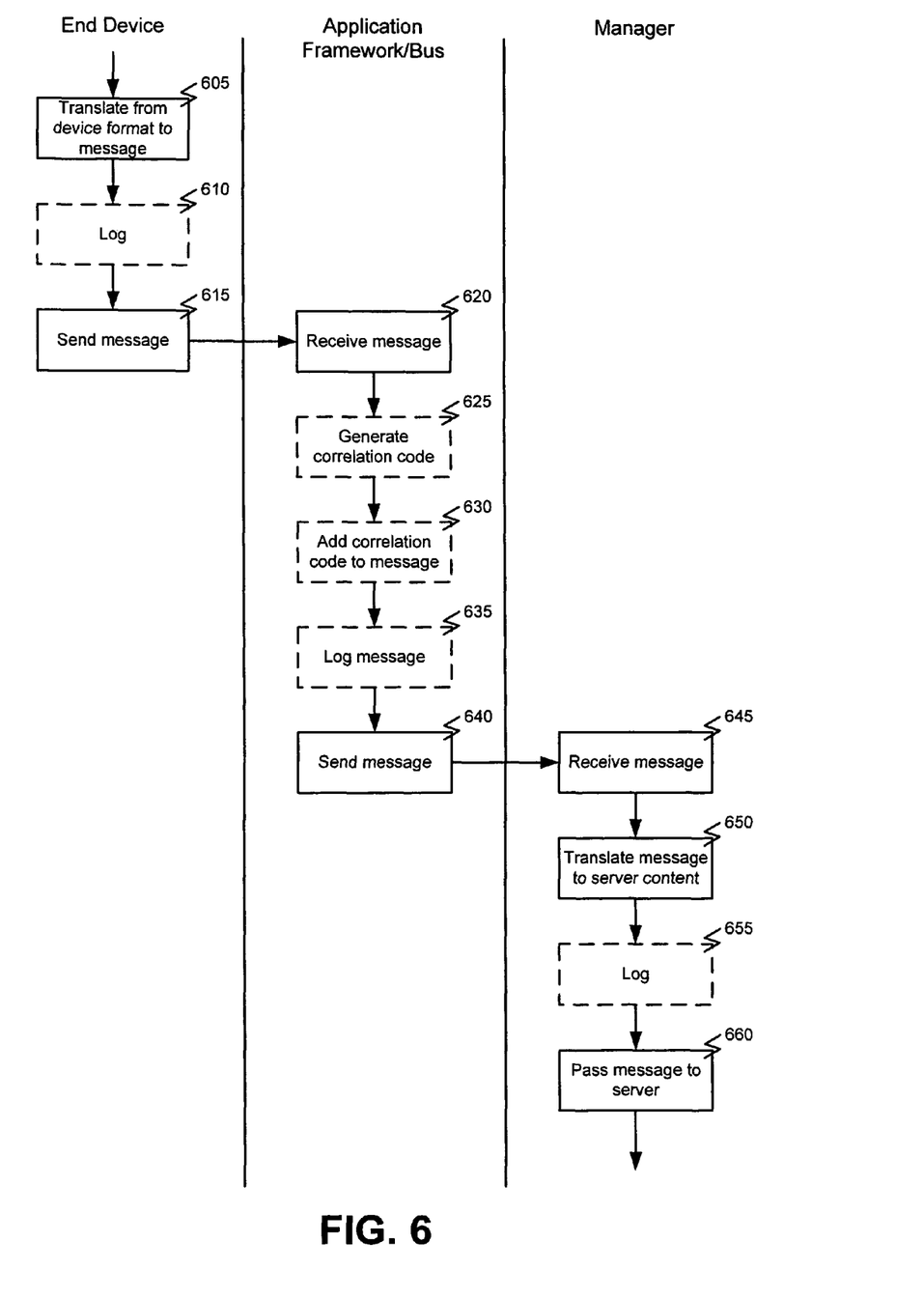
FIG. 6 is a flowchart illustrating a process for providing cross-platform support for a variety of media types according to another embodiment of the present invention.

FIG. 6 is a flowchart illustrating a process for providing cross-platform support for a variety of media types according to another embodiment of the present invention. In this example, the end device initiates a communication by translating 605 content from a device specific format to one or more common language messages for transmission on the bus to other elements of the architecture. This communication can be initiated in any of a variety of ways such as in response to the occurrence of some event, in response to a message from one of the other elements of the architecture, on a regular schedule, etc.

As discussed above, the end device can optionally log 610 the message and/or other information related to the message such as the application(s) that generated the message, the content of the message, etc. The information recorded can be maintained by the end device and/or transferred to the system audit tool, if any.

Once generated, the common language message can be sent 615 from the end device to be received 620 by the application framework and/or bus of the transport layer. As discussed above, according to one embodiment of the present invention, the software of the end device may be implemented using object-oriented programming techniques. In such a case, the end device can send a common language message by instantiating an object of a particular class type, such as a "Make-a-Call" object, with properties representing, among other possibilities, the content of data to be communicated, the intended recipient(s), etc.

As noted above, the application framework is optional. If employed, the application framework can generating 625 a code correlating the common language messages to one or more applications sending and/or receiving the messages. The application framework can then add 630 the correlation code to the message. As noted above, the common language messages can be recorded or logged 635 by the optional system audit tool, the application framework, or other system or device.

The message can be sent 640, either before or after being logged, to be received 645 by one or more managers or other component of the architecture such as another end device. As discussed above, according to one embodiment of the present invention, the manager may be implemented using object-oriented programming techniques. In such a case, the manager can send a common language message by instantiating an object of a particular class type, such as a "Make-a-Call" object, with properties representing, among other possibilities, the content of data to be communicated, the intended recipient(s), etc.

The manager can the translate 650 the common language message to a media type related to the servers with which the manager is connected. The message can be optionally logged 655 on the manager or other receiving system or device. That is, the manager can log 655 the message and/or other information related to the message such as the application(s) that generated and/or received the message, the content of the message, etc. The information recorded can be maintained by the manager and/or periodically transferred to the system audit tool, if any.

Finally, the manager can pass 660 the content of the message to the appropriate server. For example, the content may indicate a request to initiate a communication. In such a case, the device may make some indication, such as an alarm or message indicating the request.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for providing cross-platform support for a variety of media types, the system comprising:
    a plurality of servers, including at least one server providing content of one or more different media types and at least one server providing one or more services, the plurality of servers comprising an Internet Protocol television ("IPTV") server and a billing server;
    a plurality of managers, each manager communicatively coupled with one or more of the servers and translating content or services of the servers with which the manager is connected from the media types of the servers to one or more of a plurality of common language messages each of the plurality of common language messages related to one of the services of one of the servers with which the manager is connected;
    a communications bus communicatively coupled with each of the managers and receiving and transporting the one or more common language messages from the managers; and
    a plurality of end devices of different types, each end device communicatively coupled with the bus and receiving and translating the common language messages to a format specific to the end device based on the type; and
    a system audit tool communicatively coupled with the bus and monitoring common language messages on the bus, the system audit tool comprising:
        an audit tool database that maintains one or more logs of bus messages;
        a bus message logger, communicatively coupled with the bus and the audit tool database, that records messages from the bus in the audit tool database; and
        a heartbeat logger communicatively coupled with the bus and the audit tool database and recording heartbeat messages sent periodically on the bus from the one or more end devices and the one or more managers to indicate a normal status of the one or more end devices and the one or more managers;
        wherein the plurality of managers comprises a first manager coupled with a first server and correlating a user's request message to the first server with one or more missed heartbeats from the first server to identify a problem with the first server.

2. The system of claim 1, wherein the end devices generate one or more common language messages based on user input and send the one or more common language messages to one or more of the managers via the bus.

3. The system of claim 2, wherein the managers receive the common language messages from the end devices via the bus and to translate the common language messages to content of the media types of the servers with which the manager is connected.

4. The system of claim 1, further comprising an application framework interposed between the end devices and the communications bus and between the managers and the communications bus.

5. The system of claim 4, wherein the application framework comprises:
   a bus access layer, communicatively coupled with the bus, that sends and receives common language messages via the bus;
   a correlation code generator, communicatively coupled with the bus access layer and one or more applications operating on one or more of the end devices, that generates a code correlating common language messages to or from the application;
   an application bus access module, communicatively coupled with the bus access layer and the applications operating on one or more of the end devices, that adds the correlation code to the common language messages from the applications; and
   a logger, communicatively coupled with the bus access layer and the applications operating on one or more of the end devices, that records messages sent to and from the application via the bus.

6. The system of claim 1, further comprising a user profile database communicatively coupled with the bus and maintaining records of a set of user preferences for one or more of the end devices of the interface level.

7. The system of claim 6, wherein the user profile database provides the preferences to one or more of the end devices or one or more of the managers in response to a common language message received via the bus.

8. The system of claim 1, wherein the audit tool further comprises an alarm sender module that monitors the audit tool database and sends an alarm upon the detection of a trouble condition.

9. The system of claim 1, wherein the audit tool further comprises one or more viewers communicatively coupled with the audit tool database and providing user access to the information of the audit tool database.

10. The system of claim 1, wherein the common language messages comprise calls to an Application Program Interface (API).

11. The system of claim 1, wherein the common language messages comprise eXtensible Mark-up Language (XML) files.

12. A communications architecture comprising:
   a communications bus;
   an application framework communicatively coupled with the bus;
   a plurality of managers, each manager communicatively coupled with one or more servers and the application framework, wherein at least one server provides content of one or more different media types and at least one server provides one or more services, the plurality of servers comprising an IPTV server and a billing server, wherein the managers translate content of at least one of the servers with which the manager is connected from the media types of the at least one of the servers to one or more of a plurality of common language messages for transmission on the bus, wherein each of the plurality of common language messages is related to at least one of the one or more services of the servers with which the manager is connected;
   one or more end devices of different types, each end device communicatively coupled with the application framework and receiving and translating the common language messages from the managers to a format specific to the end device based on the type; and
   a system audit tool communicatively coupled with the bus and adapted to monitor common language messages on the bus, the system audit tool comprising:
      an audit tool database that maintains one or more logs of bus messages;
      a bus message logger, communicatively coupled with the bus and the audit tool database, that records messages from the bus in the audit tool database; and
      a heartbeat logger, communicatively coupled with the bus and the audit tool database, that records heartbeat messages sent periodically on the bus from the one or more end devices and the one or more managers to indicate a normal status of the one or more end devices and the one or more managers;
      wherein the plurality of managers comprises a first manager coupled with a first serve and correlating a user's request message to the first server with one or more missed heartbeats from the first server to identify a problem with the first server.

13. The communications architecture of claim 12, wherein the application framework further comprises:
   a bus access layer communicatively coupled with the bus and sending and receiving messages via the bus;
   a correlation code generator, communicatively coupled with the bus access layer and one or more applications operating on the one or more end devices of the interface layer, that generates a code correlating messages to or from the application;
   an application bus access module, communicatively coupled with the bus access layer and one or more applications operating on the one or more end devices of the interface layer, that adds the code to the message from the application and place the message on the bus via the bus access layer;
   a logger, communicatively coupled with the bus access layer and one or more applications operating on the one or more end devices of the interface layer, that records messages sent to and from the application via the bus.

14. The communications architecture of claim 12, wherein the end devices generate one or more common language messages based on user input and send the one or more common language messages to one or more of the managers via the bus.

15. The communications architecture of claim 14, wherein the managers receive the common language messages from the end devices via the bus and translate the common language messages to content of the media type of the servers with which the manager is connected.

16. The communications architecture of claim 15, wherein the common language messages comprise a "Make-a-Call" request message indicating a request to initiate a communication.

17. The communications architecture of claim 16, wherein the common language messages comprise a "Make-a-Call" response message acknowledging initiation of a communication.

18. The communications architecture of claim 15, wherein the common language messages comprise a "Call Information" request indicating a request for information relating to a communication.

19. The communications architecture of claim 18, wherein the common language messages comprise a "Call Information" response providing requested information.

20. The communications architecture of claim 15, wherein the common language messages comprise a "Call Event Notification" message indicating the occurrence of a communication.

21. The communications architecture of claim 15, wherein the common language messages comprise a periodic "Heartbeat" message indicating a normal status.

22. The communications architecture of claim 15, wherein the common language messages comprise an "Update Profile" message indicating a change to one or more user defined preferences.

23. A method of providing cross-platform support for a variety of media types, the method comprising:
- translating, with one or more managers, content provided by one or more servers from one or more media types to one or more common language messages, the one or more servers including at least one IPTV server and at least on billing server, wherein each common language message is one of a plurality of message types and each message type represents a different user-facing service provided by the server;
- sending the one or more common language messages over a communication bus to one or more end devices of one or more different device types;
- maintaining, in a database of a system audit tool, one or more logs of bus messages;
- recording, with a bus message logger, messages from the bus in the database;
- recording, with a heartbeat logger, heartbeat messages sent periodically on the bus from the one or more end devices and the one or more managers to indicate a normal status of the one or more end devices and the one or more managers; and
- correlating, with a first manager coupled with a first server, a user's request message to the first server with one or more missed heartbeats from the first server to identify a problem with the first server.

24. The method of claim 23, further comprising translating the common language messages to a format specific to one or more of the end devices based on the device type.

25. The method of claim 24, further comprising:
- generating one or more common language messages with one of the end devices based on user input to the end device; and
- sending the one or more common language messages based on user input from the end device to one or more of the servers.

26. The method of claim 25, further comprising translating the common language messages based on user input to content of one or more of the media types.

27. The method of claim 23, further comprising:
- generating a code correlating the common language messages to one or more applications;
- adding the correlation code to the common language messages; and recording the common language messages.

* * * * *